Oct. 6, 1964　　　　　　G. B. MOONEY　　　　　　3,152,285
RECLOSER SEQUENCE CHANGING MEANS
Filed Sept. 22, 1960　　　　　　　　　　　　　7 Sheets-Sheet 2

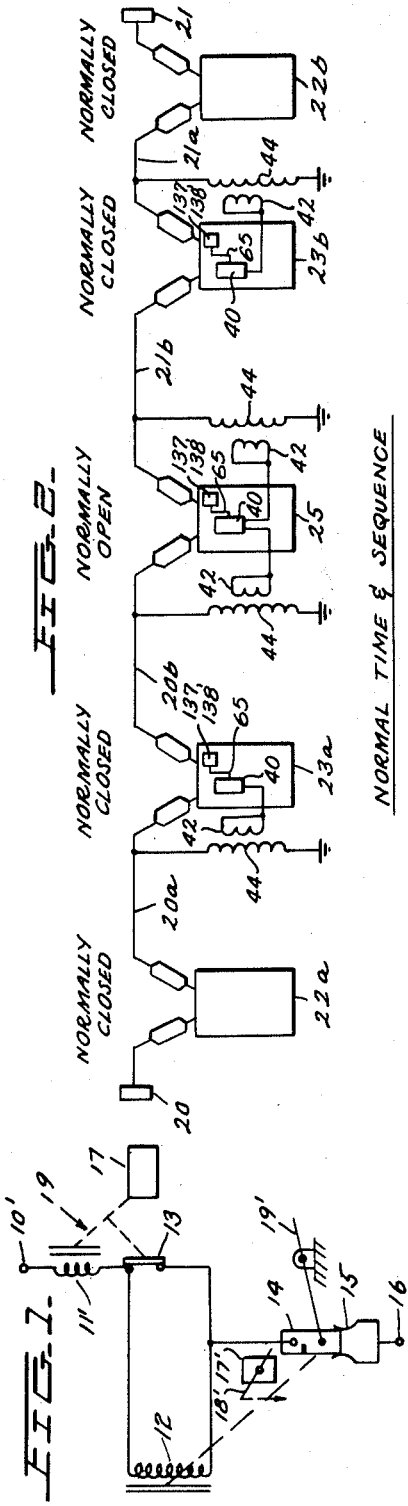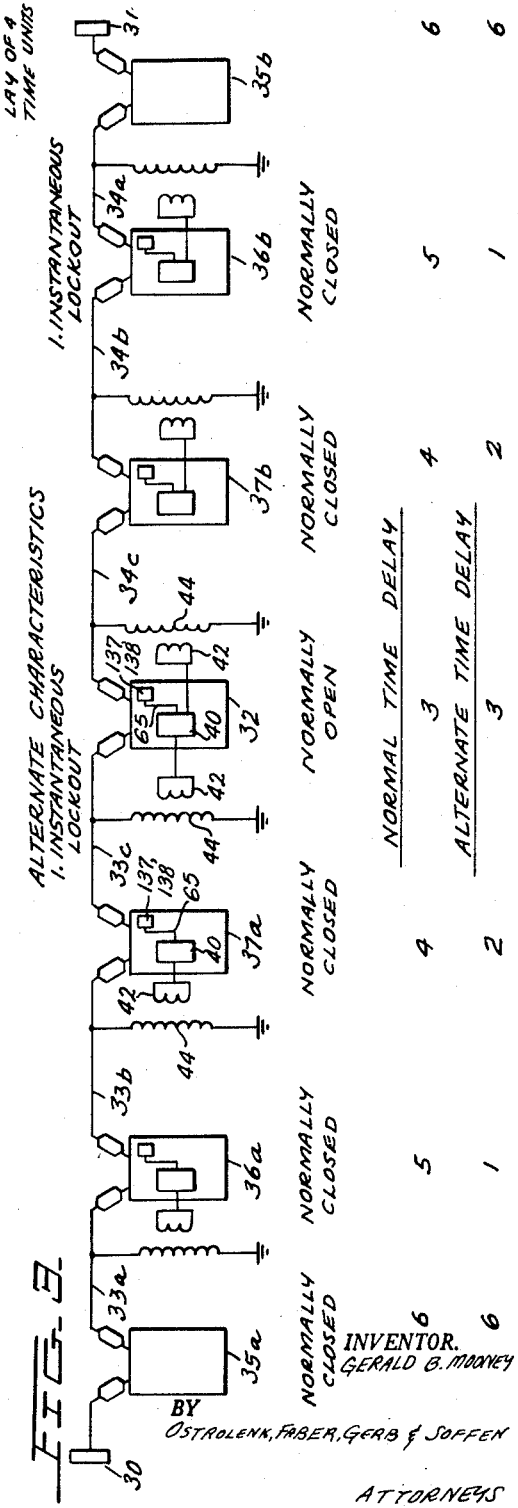

FIG. 4

INVENTOR.
GERALD B. MOONEY
BY
OSTROLENK, FABER, GERB & SOFFEN.

ATTORNEYS

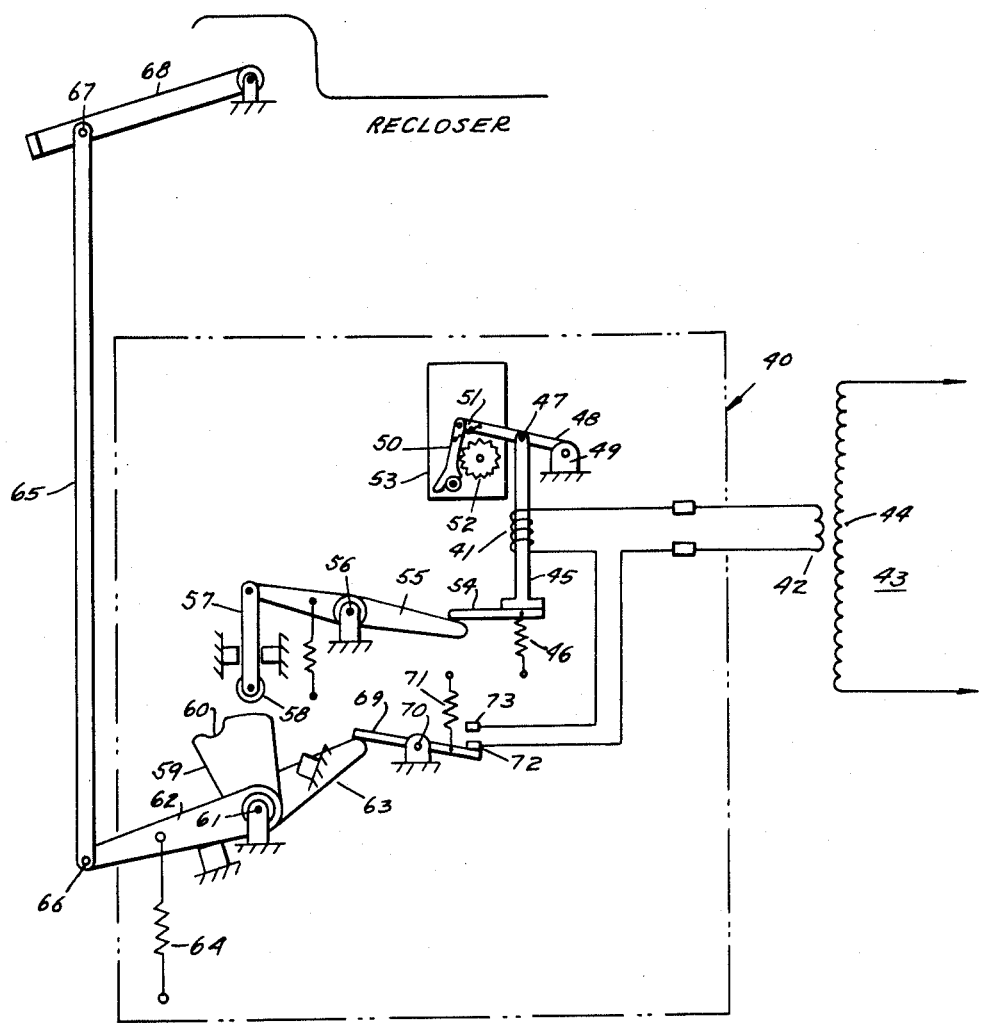

Oct. 6, 1964     G. B. MOONEY     3,152,285
RECLOSER SEQUENCE CHANGING MEANS

Filed Sept. 22, 1960     7 Sheets-Sheet 4

INVENTOR.
GERALD B. MOONEY
BY
OSTROLENK, FABER, GERB & SOFFEN
ATTORNEYS

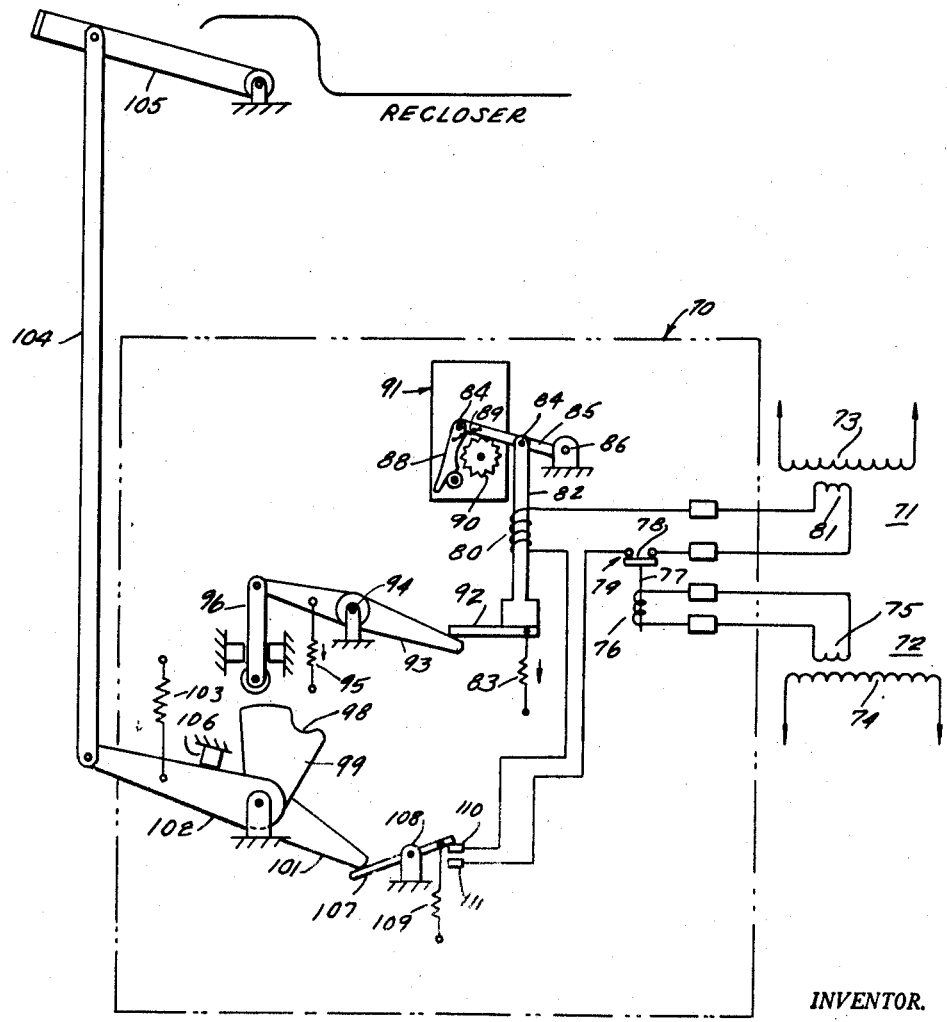

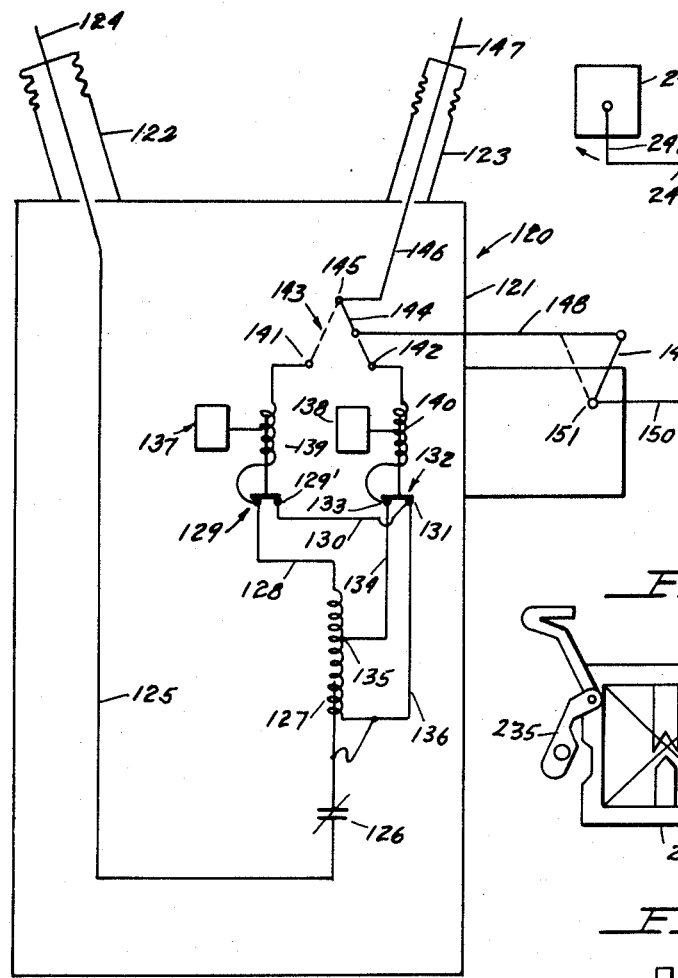

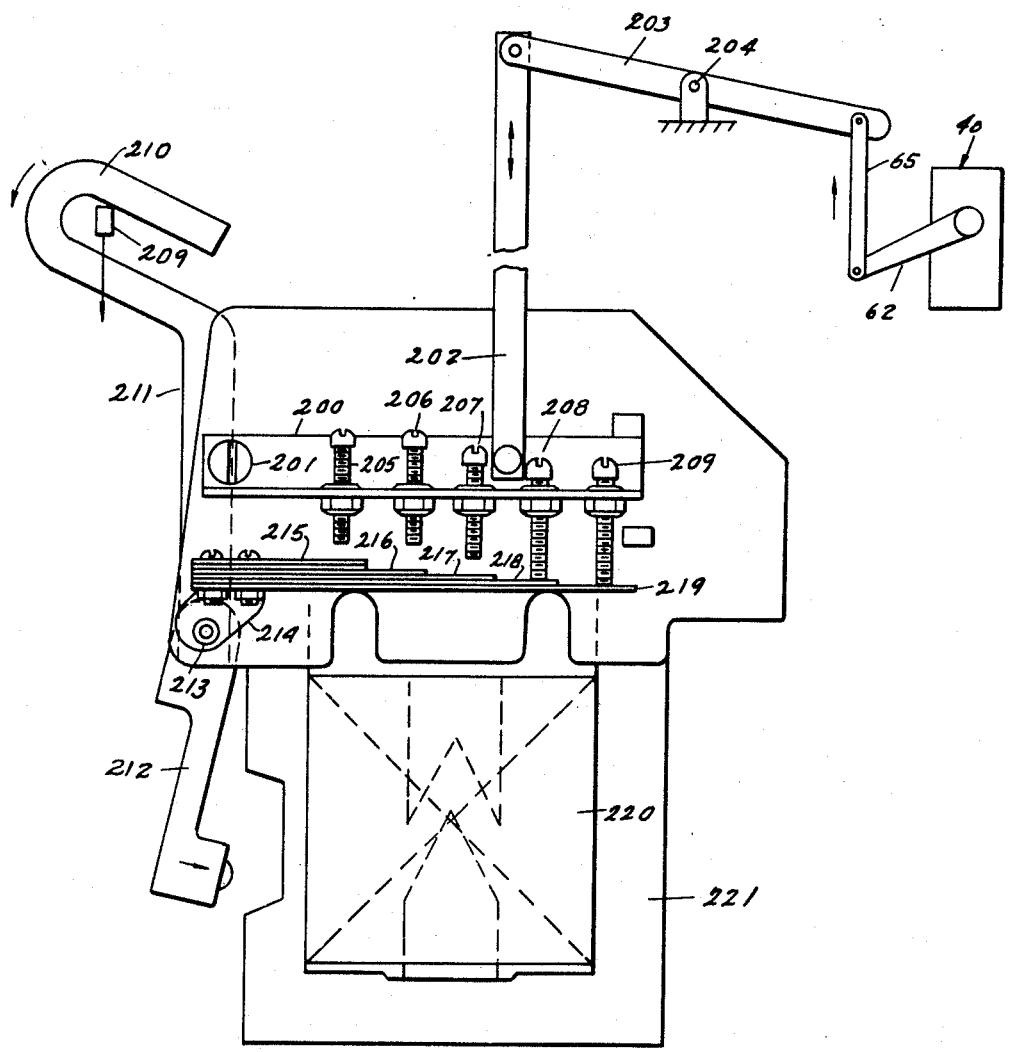

United States Patent Office 3,152,285
Patented Oct. 6, 1964

3,152,285
RECLOSER SEQUENCE CHANGING MEANS
Gerald B. Mooney, Greensburg, Pa., assignor to I-T-E Circuit Breaker Company, Philadelphia, Pa., a corporation of Pennsylvania
Filed Sept. 22, 1960, Ser. No. 57,803
16 Claims. (Cl. 317—22)

This invention relates to circuit interrupters of the automatic reclosing type and more particularly to a recloser having means for automatically changing the operating characteristic thereof.

In electric distribution systems, especially in rural areas, circuit interrupters of the automatic reclosing type are often employed. When a circuit breaker of this type is subjected to a fault current the breaker opens and thereafter goes through one or more sequenced closing operations in accordance with conditions prevailing. If the fault condition persists, after the closing sequence is complete the circuit breaker will be locked open, but if the fault has cleared during the sequence interval the circuit breaker remains closed and resets to initial condition.

Thus, if a persisting fault occurs close to the power station, those sections of the distribution system more remote from the power station than the locked open recloser will be without power. Since most faults are the result of a localized condition, if this condition can be isolated the remainder of the system can be safely energized.

The prior art has sought to provide means for isolating a faulted section of line while restoring service to the remainder of the system. The prior art devices required fault sensing equipment which included differential relays or semi-conductor devices operating on a phase comparison basis or by means of oscillation detection. These systems were costly to install, required extensive maintenance, and could not be reliably operated under differing climatic conditions.

Accordingly, this invention provides an automatic loop sectionalizing system utilizing automatic reclosers to isolate the faulted section of line. In the system contemplated by this invention two bus sections are fed from separate sources of electrical energy. The ends of the buses remote from the energizing sources are connected to a normally open tie automatic recloser which when closed connects the buses in electrical series. A plurality of automatic reclosers each having dual tripping characteristics are provided between the ends of each bus and are connected so as to divide each bus into a plurality of sections.

By dual tripping characteristics it is meant that the recloser is provided with a normal tripping characteristic and an alternate tripping characteristic. The normal tripping characteristic is of the type well known to the art whereby the reclosers associated with each bus are arranged for sequential tripping in a manner such that the recloser most remote from the energizing source will trip after the shortest time delay. The alternate tripping characteristic is such that the reclosers of one bus section cooperate with the reclosers of the other bus section as well as with the tie circuit breaker, when the tie circuit breaker is closed, for sequential tripping whereby the recloser most remote from the energizing source trips after the shortest time delay. If any recloser in a bus section remains open for a sufficient period of time the other reclosers in that section more remote from the energizing source than the open recloser have the tripping time characteristic thereof automatically shifted to their alternate tripping characteristics and the normally open tie recloser is automatically closed.

The means for shifting a recloser from its normal to its alternate tripping characteristic comprises a device held in a ready position when energized. Typically this device comprises an energy storing means held inactive by an energized solenoid. Upon de-energization of the solenoid, the energy storing means acting against a time delay mechanism moves an operating link to a position in which the recloser is set to its alternate tripping characteristic.

Perhaps the most simple form of alternate tripping characteristic is that in which the recloser automatically locks open after a single tripping operation. For this arrangement, the operating link is tied to a safety lockout lever of a type described in U.S. Patent No. 2,843,699 to D. L. Leatherberry.

The tie recloser is normally in a position wherein the safety lockout lever has been activated and the recloser locked in the open position. The loss of voltage sensing means is arranged to deactivate the safety lockout lever so that the recloser will automatically reclose.

In addition to utilizing the safety lockout feature as a means for establishing an alternate tripping characteristic, the recloser may be equipped with dual control coils, dual control switches, dual timing devices and integrators of two sets of miscellaneous parts. In effect this type of recloser is comprised of two reclosers having individually adjustable time current characteristics and sequences. Selection of operation under the normal or alternate tripping characteristic is accomplished by a rating selector switch operable by the operating link of the loss of voltage sensing device previously described.

Another means for providing an alternate tripping characteristic is to provide a device which introduces additional retarding leaf springs in association with the recloser control solenoid. Still another method is to selectively increase or decrease the ampere turns of the recloser solenoid coil. Yet another method is to provide means for altering the reluctance of the control solenoid iron circuit.

A further method is to provide a clutch means to shift the mechanism for operation in cooperation with restraining springs having different characteristics. A still further method is to provide means for adding or subtracting a timer mechanism flywheel.

Accordingly, a primary object of this invention is to provide an automatic recloser including means responsive to circuit conditions for automatically shifting the tripping characteristics of the recloser.

Another object is to provide a novel means responsive to a loss of voltage condition to shift the tripping characteristic of an automatic recloser from its normal tripping characteristic.

Still another object is to provide a novel means responsive to a loss of voltage for operating the safety lockout lever of an automatic recloser.

The foregoing objects as well as other objects of this invention shall become readily apparent after reading the following description of the accompanying drawings in which:

FIGURE 1 is a schematic diagram of a type of automatic recloser utilized for the subject invention.

FIGURE 2 is a schematic illustrating a loop sectionalizing arrangement in which the power line is divided into four sections.

FIGURE 3 is a schematic illustrating a loop sectionalizing arrangement in which the power line is divided into six sections.

Figure 5:
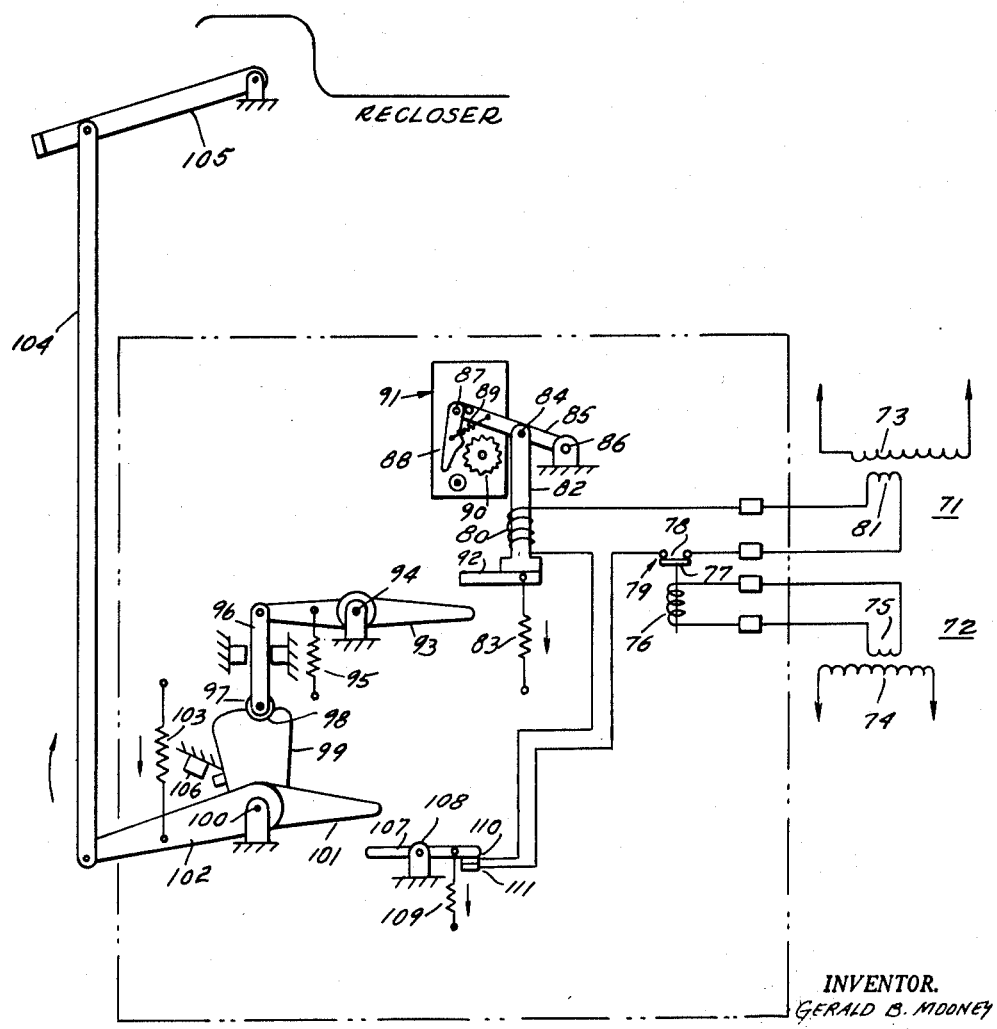

FIGURES 4 and 4A are schematics illustrating a sequence changing device actuated in response to a loss of voltage for changing the recloser from its normal tripping characteristic to an alternate tripping characteristic. With the device in the position of FIGURE 4, the recloser is operable in accordance with its normal tripping characteristic, whereas with the device in the position of FIGURE 4A, the recloser is set for operation with its alternate tripping characteristic.

FIGURES 5 and 5A are schematics illustrating a modification of the device of FIGURES 4 and 4A. The device of FIGURES 5 and 5A is utilized for operating the tie recloser to a closed position upon a loss of voltage. With the device in the position of FIGURE 5, the tie recloser is locked open, and with the device in the position of FIGURE 5A, the tie recloser is conditioned for operation through a reclosing sequence.

FIGURES 6 through 11 are schematics illustrating means for providing reclosers with dual tripping characteristics. In the device of FIGURE 6, this is achieved by providing two timing mechanisms and two integrators, as well as two sets of operating controls for an individual recloser. In the devices of FIGURES 7 and 8, means are provided for altering the spring resistance of the time bar. In FIGURE 7, a dual time bar is provided, while in FIGURE 8, a single time bar is utilized. In FIGURES 9 and 10, timer operation is modified by changing the reluctance of the iron circuit and by changing the ampere turns of the magnet, respectively. In FIGURE 11, the timer speed is changed by altering the flywheel thereof.

Now referring more particularly to FIGURE 1, which shows a typical recloser of the type illustrated in U.S. Patents 2,693,514 and 2,738,394. Recloser 19 comprises terminal 10' connected to magnet winding 11'. Winding 11' is connected to the parallel combination of magnet winding 12 and contact assembly 13, this parallel combination then being connected in series with movable contact 14 which is movable in an open and closed position with respect to cooperating contact 15. During normal operation, current proceeds from terminal 10' through the magnet winding 11', contact 13 (which is closed under normal conditions), movable contact 14 and terminal 16.

Upon the occurrence of an overload, magnet winding 11' will be energized beyond a predetermined value and in some desired manner, this overenergization will cause contact disengagement of the contacts 13 so as to force current flow through the winding 12. Winding 12, however, is so constructed to cause the movable contact 14 to move to a disengaged position with respect to contact 15 upon energization thereof so as to effect disengagement of the contacts.

After the arc between separated contacts 14 and 15 is interrupted, winding 11' is de-energized and contact 13 immediately closes. A timing mechanism, which is here merely illustrated as the box 17 and may be seen in more detail in conjunction with the above noted U.S. Patents 2,693,514 and 2,738,394, will allow a re-engagement between the recloser contacts.

In the event that the fault condition is still on the line, magnet winding 11' will again be energized beyond its predetermined value so as to cause control contact 13 to reopen to thereby cause re-energization of coil 12 and a reopening of the contact 14.

This sequence is then continued for a predetermined number of times under a continuing fault condition until the timing mechanism 17 will lock the control contact 13 and the contacts 14 and 15 in a predetermined position.

Contact 14 is movable to disengaged position by manually operable means 19'. If it is desired that the cyclic operation of contacts 14, 15 to their open position responsive to fault conditions be defeatable, lever 18' of safety lockout device 17' is appropriately positioned. The construction of device 17' is described in detail in U.S. Patent 2,843,699. With the lockout lever 18' activated, the reclosing contacts 14, 15 will be maintained in open position upon their first movement thereto.

*Loop Sectionalizing Arrangements*

In FIGURE 2, there is illustrated a power distribution system utilizing reclosers of the type illustrated in FIGURE 1, appropriately modified, as will be hereinafter explained. The distribution system is energized from separate voltage sources 20, 21.

Source 20 normally feeds a bus divided into two sections, 20a and 20b. Similarly, source 21 normally feeds a bus divided into two sections, 21a and 21b. One end of bus section 20a is connected through recloser 22a to source 20, while the other end of bus section 20a is connected through recloser 23a to one end of bus section 20b. The other end of bus section 20b is connected through tie recloser 25 to bus section 21b. Bus sections 21a, 21b are connected by recloser 23b, with bus section 21a being connected to source 21 through recloser 22b.

With the distribution system operating normally, tie recloser 25 is open and the other reclosers 22a, 22b, 23a, 23b, are closed and are connected for operation under a normal tripping time characteristic, which is typical of reclosers well known to the art. The number of automatic reclosing operations and the time delay for the tripping operations are set forth below each of the reclosers illustrated in FIGURE 2.

Reclosers 23a, 23b and tie recloser 25 are each provided with a device, whose construction shall be hereinafter explained, which, acting in response to a loss of voltage on the source side of the respective reclosers, will cause the recloser mechanism to shift for operation under an alternate tripping time characteristic. The alternate tripping time characteristics of the reclosers are set forth in FIGURE 2 below the respective reclosers.

If a fault occurs at bus section 21a, recloser 22b goes through its normal tripping sequence and locks out so that service is lost from recloser 22b to tie recloser 25. After lockout of recloser 22b and a suitable time delay, as will be hereinafter explained, means associated with recloser 23b senses the loss of voltage on the source side thereof, causing the lockout lever of recloser 23b to be activated, as will be hereinafter explained. Recloser 23b is now set for one instantaneous trip and lockout.

At the same time, means associated with tie recloser 25 also senses a loss of voltage and, after a suitable time delay, tie recloser 25 also closes. Now there is a complete circuit from source 20 to the fault at bus section 21a. This causes recloser 23b to trip instantaneously and operate to lockout. Tie recloser 25 and reclosers 22a, 23a may also trip instantaneously, but will reclose on non-faulted portions of the distribution system, so that reclosers 25, 22a, 23a will remain closed after reclosing, thereby restoring service to all of the bus sections, 20a, 20b and 21b, between source 20 and recloser 23b.

Should a fault occur at bus section 21b, recloser 23b goes through its normal reclosing sequence to lock out. Tie recloser 25 closes after a time delay and thereafter goes through its reclosing sequence and finally locks out, thereby isolating the fault between tie recloser 25 and recloser 23b.

For restoration to normal operation after repairing a faulted condition at bus section 21a, recloser 22b is closed. The safety lockout lever of recloser 23b is manually reset to return recloser 23b for operation under its normal tripping time characteristic. Recloser 23b is then closed. The safety lockout lever of tie recloser 25 is reset and tie recloser 25 is opened, so that all of the reclosers are now in their normal positions and operating under their normal tripping time characteristics. Similar operations are required for restoration of service after a fault occurs on any of the other sections of bus.

In FIGURE 3, there is illustrated a power distribution system loop sectionalizing arrangement which is an extension of the sectionalizing arrangement previously described in connection with FIGURE 2. In the system of FIGURE 3, two voltage sources, 30, 31, energize two sections of bus which are connected by normally open tie recloser 32. Source 30 normaly energizes bus sections 33a–33c, while source 31 normally energizes bus sections 34a–34c.

Reclosers 35a, 35b connect bus sections 33a, 34a, respectively, to voltage sources 30, 31, respectively. Reclosers 36a, 36b connect bus sections 33a, 33b and 34a, 34b, respectively, in electrical series. Reclosers 37a, 37b connect bus sections 33b, 33c and 34b, 34c, respectively, in electrical series. The time delay intervals for normal and alternate tripping characteristic operations are indicated below the respective reclosers in FIGURE 3.

When a fault occurs at bus section 34b, the sequence of operation is as follows:

(1) Recloser 36b opens after five units of time.

(2) Recloser 37b, sensing a loss of voltage on its line side, shifts for operation to its alternate tripping characteristic time setting of two units of time.

(3) After seven units of time, tie circuit breaker 32 closes.

(4) After two additional units of time, recloser 37b opens, thereby isolating bus section 34b and restoring service to all remaining sections of bus.

It is obvious that through a similar sequence of operations, faults at any other location of the distribution system will be similarly isolated. The two radial sections left in service after the faulted section has been isolated will still be selectively protected until the reclosers are restored to operation with their normal tripping time characteristics.

For the systems illustrated in FIGURES 2 and 3, it is to be noted that for normal tripping characteristic operation those reclosers more remote from the tie recloser are provided with longer time delays. After a fault has been isolated, the tie recloser is coordinated with those reclosers operating with an alternate time characteristic as well as those reclosers associated with the non-faulted bus, whereby sequential operation as to time and/or magnitude of fault current is still maintained.

*Sequence Changing Device*

In the loop sectionalizing system hereinbefore described, automatic reclosers are utilized to isolate the faulted bus sections. A number of these reclosers are provided with means for changing their operation from a normal tripping time characteristic to an alternate tripping time characteristic, responsive to an indication that there is a loss of voltage on the line side of the respective recloser. The sequence changing device 40 for a normally closed recloser is illustrated in FIGURES 4 and 4A.

Device 40 comprises operating solenoid 41, energized through the secondary winding 42 of potential transformer 43, whose primary winding 44 is connected from ground to the bus on the source side of the associated recloser. When voltage is present on the source side of the recloser, solenoid 41 is energized causing the solenoid plunger 45 to be maintained in its raised position of FIGURE 4 against the biasing action of spring 46.

Spring 46 is connected to the lower end of plunger 45 while the upper end of plunger 45 is connected at 47 to link 48 at a point intermediate the ends thereof. One end of link 48 is mounted to stationary pivot 49, while the other end has pivotally mounted thereto pawl 50, which is biased by spring 51 into operative engagement with gear 52 of timing mechanism 53. Mechanism 53 is of a construction well known to the art to provide a retarding influence to downward movement of plunger 45.

With solenoid 41 deenergized, spring 46 acts to move plunger 45 downward. This downward movement, however, is delayed through the engagement of pawl 50 with the timing mechanism gear 52. After a predetermined interval of time determined by the retarding influence of timing mechanism 53, plunger extension 54 strikes one arm of crank 55 causing rotation thereof in clockwise direction about fixed pivot 56 from the position of FIGURE 4 to the position of FIGURE 4A. This causes link 57, whose upper end is tied to the other arm of crank 55 to move vertically upward.

The lower end of link 57 carries latch roller 58 which is disposed within depression 60 of latch member 59 when link 57 is in its lowermost position of FIGURE 4. Latch member 59 is pivotally mounted to fixed pivot 61 and is connected to arms 62, 63 in a manner such that these arms 62, 63 and latch member 59 pivot in unison about 61. When latch roller 58 is moved out of depression 60, spring 64, acting downwardly, causes arm 62 to rotate in a counterclockwise direction about pivot 61.

Vertically positioned operating link 65 is connected at its lower end 66 to arm 62 near the free end thereof. The upper end of link 65 is connected at 67 to the safety lockout lever 68 or other suitable member of a recloser, as will be hereinafter explained. Thus, when arm 62 moves counterclockwise from its position of FIGURE 4 to its position of FIGURE 4A, operating link 65 is caused to move downward.

As fully explained in U.S. Patent 2,843,699, when the safety lockout lever of a recloser is activated, upon subsequent tripping of the recloser the recloser will not go through a series of timed opening and closing operations. With operating link in the lowered position of FIGURE 4A, the recloser safety lockout lever is activated.

Timing mechanism 53 is provided to impose a time delay between the loss of voltage and the change of sequence from normal to alternate tripping characteristic operation. This time delay enables the recloser to maintain normal sequence for temporary loss of voltage, such as an open interval between the instantaneous and time delay trips of associated reclosers. Restoration of voltage before completion of the time delay period imposed by mechanism 53 automatically restores the timing mechanism to the "ready" position of FIGURE 4.

An auxiliary switch comprising cooperating contacts 72, 73 is provided and connected as shown for disconnecting solenoid 41 until the associated recloser is reset. A similar switch may be provided for signalling purposes. Auxiliary switch contact 72 is carried on one arm of crank 69, which is pivoted at point 70. Spring 71, acting upon crank 69 urging same in a counterclockwise direction, biases contact 72 toward engagement with contact 73. With operating link 65 in its lowered position, arm 63 engages crank 69, rotating same in a clockwise direction against the force of spring 71, causing contact 72 to part from contact 73. Contacts 72, 73, when parted, will open the series circuit between solenoid 41 and the transformer secondary 42.

Device 40 is reset when the recloser safety lockout lever 68 is moved to the "inactive" position. This is usually accomplished manually by a hook stick or similar device, or automatically by a suitable recloser attachment. Moving safety lockout lever 68 to the "inactive" position of FIGURE 8 restores the associated recloser for operation under its normal tripping time characteristic and also permits the recloser to close.

FIGURES 5 and 5A illustrate a device 70 for permitting the closing of a tie circuit recloser upon a loss of voltage at any section of the connected buses. Device 70 includes potential transformers 71, 72, whose primaries 73, 74, respectively, are connected to individual terminals of the tie recloser. The secondary 75 of transformer 72 energizes auxiliary solenoid 76, whose plunger 77 carries bridging contact 78 of switch 79. Switch 79 is connected in circuit between solenoid 80 and its energizing means comprising secondary 81 of transformer 71.

Solenoid plunger 82 is biased downwardly by spring 83 and the upper end of plunger 82 is connected at 84 to link 85 intermediate the ends thereof. One end of link 85 is mounted to fixed pivot 86 and the other end is connected at 87 to pawl 88. Spring 89, connected between arm 85 and pawl 88, biases the latter into operative engagement with gear 90 of timing mechanism 91. Plunger extension 92 is positioned to engage and thereby rotate crank 93 clockwise about its pivot 94 upon downward movement of plunger 82.

Crank 93 is biased in a counterclockwise direction by spring 95, so that latch arm 96 is normally in the down position of FIGURE 5, wherein latch roller 97 is disposed within depression 98 of latch member 99, which is pivotally mounted at 100. Arms 101 and 102 are also mounted to pivot 100 and are connected to latch member 99 so that all three elements, 99, 101, 102 pivot in unison. Spring 103 biases arm 102 in a clockwise direction, thereby biasing operating link 104 secured to the free end of arm 102 in an upward direction. Operating link 104 is connected to the recloser safety lockout lever 105.

When arm 102 is rotated to its most clockwise position against stop 106, arm 101 engages crank 107, pivoted at 108, and moves same in a counterclockwise direction against the force of biasing spring 109. Crank 107 carries contact 110 of auxiliary switch 111, which is serially connected between solenoid winding 80 and switch 79 so that opening of switch 111 is effective to open the energizing circuit for solenoid 80.

With operating link 104 in its downward position of FIGURE 5, the recloser safety lockout lever maintains the tie recloser locked open, and upon movement of safety lockout lever 105 to its position of FIGURE 5A, the tie recloser is closed and set for operation through a normal sequence. Thus it is seen that if potential transformer 71 is deenergized, solenoid 80 is directly deenergized and if potential transformer 72 is deenergized, auxiliary solenoid 76 is directly deenergized, which opens switch 79 to deenergize solenoid 80.

The timing mechanism 91 is so constructed that the downward movement of plunger 82, upon deenergization of solenoid 80, is retarded notwithstanding the biasing action of spring 83. When latch roller 97 is finally removed from depression 98, spring 103 operates link 104 from the position of FIGURE 5 to the position of FIGURE 5A. This permits arm 101 to open switch 111 so that upon subsequent restoration of power to transformers 71, 72, solenoid 80 will remain deenergized.

*Dual Tripping Time Characteristic Devices*

FIGURE 6 illustrates a first embodiment of an automatic recloser 120 having dual tripping time characteristics. Recloser 120 is comprised of casing 121 having insulator bushings 122, 123 extending upwardly from the top thereof. Terminal 124 is connected through conductor 125 and normally closed main contactor 126 to one end of operating coil 127. The other end of coil 127 is connected through conductor 128 to switch 129.

Conductor 130 connects switch terminal 129' to terminal 131 of switch 132 whose other terminal 133 is connected through conductor 134 to coil tap 135. Conductor 136 connects switch terminal 131 to the lower end of coil 127.

Recloser 120 further includes two totally independent timer-integrators 137, 138, each of a conventional design well known to the automatic recloser art. Timer-integrators 137, 138 are associated with control coils 139, 140, respectively. The bridging contacts of switches 129, 132 are carried by the plungers of coils 139, 140, respectively, so that upon energization of these respective coils their associated switches 129, 132 will be opened.

Coils 139, 140 are connected to terminals 141, 142, respectively, of switch 143. Switch arm 144 is pivoted at terminal 145 so as to be movable between terminals 141, 142. Conductor 146 connects switch terminal 145 to recloser terminal 147.

Switch arm 144 is connected through links 148, 149 and 150 to a suitable operating device such as the device illustrated in FIGURES 4 and 4A. The free end of link 150 may be connected to the upper end of operating link 65 of FIGURES 4 and 4A. Link 150 is mounted to stationary pivot 151, having link 149 mounted thereon. Links 149, 150 are rigidly secured thereto for operation in unison about pivot 151. Thus, when link 150 is rotated in a counterclockwise direction through the upward movement of operating link 65, switch arm 144 will be moved from its solid line position of FIGURE 6 to the dotted line position thereof.

In the dotted line position of switch arm 144 in FIGURE 6, control coil 139 is energized, so that recloser 120 is set for operation, controlled by timer-integrator 137. When recloser 120 is operating through the control of timer-integrator 137, it is said that recloser 120 is operating under its normal tripping time characteristic. When switch arm 144 is in the solid line position of FIGURE 6, control coil 140 is energized and recloser 120 is operating under the control of timer-integrator 138. When recloser 120 is thus operated, it is said to be operating under an alternate tripping time characteristic. That is, the characteristic operation dictated by timer-integrator 137 differs from the characteristic imparted by timer-intergrator 138.

FIGURES 7 and 8 illustrate other embodiments of this invention directed to devices whereby the operation of a recloser may readily be changed from its normal tripping time characteristic to an alternate tripping time characteristic. In the aforesaid U.S. Patent 2,738,394, the device illustrated includes means for achieving time delayed tripping. The delay is imposed by a so-called "time bar," which is a pivoted member carrying a plurality of adjusting screws. The screws are engageable with individual leaf springs. The greater the number of springs engaged by the time bar screws, the greater will be the retarding force acting upon the movable armature of a magnet energizable by fault current flowing through the recloser.

Now referring more particularly to FIGURE 7. Movable armature 150 is keyed to shaft 151, having hook extension 152 also keyed thereto. The hook 153 of extension 152 is in engagement with rod 154 of a suitable time delaying escapement mechanism. Shaft 151 is mounted to central clutch member 155 so as to be movable thereby into engagement with end clutch members 155a, 155b. End clutch member 155a is provided with a plurality of leaf springs 156–158 mounted thereto. Fixedly mounted time bar 159 is operatively positioned above springs 156–158 and is provided with plurality of adjusting screws, 160–162, whose tips are engageable by springs 156–158, respectively.

With shaft 151 connected to end clutch member 155a, when the magnet associated with armature 150 is sufficiently energized to attract armature 150 thereto, springs 156–158 will impose forces which must be overcome in moving armature 150. These forces are not available to move members 154 of the timing mechanism, so that tripping is delayed. The time delay interval is adjustable by adjusting the positions of screws 160–162 relative to their associated leaf springs 156–158.

Another time bar 169, having a plurality of adjusting screws 170–172, is operatively positioned so that the tips of screws 170–172 are engageable with leaf springs 173–175, respectively, carried by end clutch member 155b.

A suitable switching arrangement, 176, which includes links 177–179, is provided to selectively move central clutch member 155 and thereby operatively connect shaft 151 to one or the other of the outer clutch members 155a, 155b.

The settings of adjusting screws 160–162 are different from the settings of screws 170–172 with respect to their associated leaf springs and, in addition, the stiffness of springs 156–158 may differ from the stiffness of springs 173–175. Thus, different magnitudes of retarding forces act upon armature 150, depending upon the position of clutch member 155.

In the embodiment of FIGURE 8, a single time bar 200 is utilized. Time bar 200 is pivoted at one end upon stationary pivot 201. One end of vertical link 202 is connected to time bar 200 while the other end of link 202 is connected to crank 203, pivotally mounted at 204 and connected to operating link 65 of operating characteristic changer 40.

Adjusting screws 205–209 are mounted to time bar 200 and are operatively positioned for engagement by leaf springs 215–219, respectively. Leaf springs 215–219 are mounted to bracket 214 fixedly mounted to rotatable shaft 213, which also has fixedly mounted thereto armature 212 and arm 211. Hook 210 at the upper end of arm 211 is engageable with timer lever 209.

When control coil 220 associated with magnet 221 is sufficiently energized the flux generated thereby will attract armature 212, causing pivoting thereof in a counterclockwise direction with respect to pivot 213. This causes springs 215–219 to engage adjusting screws 205–209, respectively, as armature 212 travels through its full range of movement. When time bar 200 is pivoted counterclockwise about pivot 201 to a raised position through the upward movement of link 202, caused by the downward movement of link 65, then only springs 218, 219 engage their associated adjusting screws 208, 209, respectively, as armature 212 travels through its full range of movement. Thus, it is seen that with time bar 200 in the raised position, a lesser retarding force will be exerted upon armature 212 than is exerted thereon when time bar 200 is in its lowered position of FIGURE 8.

In the embodiment of FIGURE 9, a device 230, similar in construction to sequence changer 40, operates through links 231, 232 to change the position of auxiliary armature 233 associated with control magnet 234. When link 232 is moved to the left with respect to FIGURE 9, auxiliary armature 233 moves toward magnet 234, thereby reducing the reluctance of the magnetic path and increasing the magnetic forces acting upon main armature 235, thereby increasing timer speed and decreasing the time delay interval.

In the embodiment of FIGURE 10, the sequence changing device 240, acting through links 241, 242 operates switch arm 243, which is pivoted about contact 244 into and out of engagement with contact 245. With switch arm 243 in engagement with contact 245, a considerable portion of the control magnet energizing coil 246 will be shorted. This is the condition prevailing when the recloser is operating with a normal tripping time characteristic. When switch arm 243 separates from contact 245, the number of ampere turns energizing the control magnet is increased, thus increasing the timer speed and decreasing the time delay interval.

In the device of FIGURE 11, sequence changer 250 acts through links 251, 252 to selectively change the position of clutch 253, so that one or both of the timer flywheels 254, 255 drive the timing mechanism 256 toward runout.

Thus, this invention provides a simplified, relatively inexpensive arrangement for isolating a faulted section of a power distribution system. The arrangement utilizes circuit breakers of the automatic reclosing type, slightly modified so that they operate selectively with a normal tripping time characteristic or an alternate tripping time characteristic.

Although there has been described preferred embodiments of this invention, many variations and modifications will now be evident to those skilled in the art and, therefore, the scope of this invention is to be limited not by the specific disclosure herein detailed, but only by the appended claims.

I claim:

1. A first and a second bus, normally open circuit interrupter which when closed serially connects said buses, a first and a second normally closed circuit breaker connected to said first and said second buses, respectively, intermediate the ends thereof, each of said circuit breakers being of the automatic reclosing type and having first means for establishing normal and second means for establishing alternate time relay tripping characteristics, said circuit interrupter being of the automatic reclosing type having a time delay tripping characteristic whose tripping time interval is less than the tripping time intervals of said normal tripping time characteristics and greater than the time intervals of said alternate tripping time characteristics, third means responsive to predetermined circuit conditions in either bus for closing said circuit interrupter, and fourth means responsive to predetermined circuit conditions in the associated bus for shifting operation of a selected one of said circuit breakers closest to the said condition to operation under its alternate tripping characteristic whereby a faulted section of bus is isolated and all other bus sections remain energized; each of said third and said fourth means comprising a device activated in response to a loss of voltage in the bus at its associated circuit interrupting means to activate said third and fourth means.

2. A first and a second bus, normally open circuit interrupter which when closed serially connects said buses, a first and a second normally closed circuit breaker connected to said first and said second buses, respectively, intermediate the ends thereof, each of said circuit breakers being of the automatic reclosing type and having first means for establishing normal and second means for establishing alternate time delay tripping characteristics, said circuit interrupter being of the automatic reclosing type having a time delay tripping characteristic whose tripping time interval is less than the tripping time intervals of said normal tripping time characteristics and greater than the time intervals of said alternate tripping time characteristics, third means responsive to predetermined circuit conditions in either bus for closing said circuit interrupter, and third means responsive to predetermined circuit conditions in the associated bus for shifting operation of a selected one of said circuit breakers closest to the said conditions to operation under its alternate tripping characteristic whereby a faulted section of bus is isolated and all other bus sections remain energized; each of said third and said fourth means comprising a device activated in response to a loss of voltage in the bus at its associated circuit interrupting means to activate said third and fourth means; each of said devices including fifth means for retarding operation thereof until a predetermined time interval has elapsed.

3. A first and a second bus, normally open circuit interrupter which when closed serially connects said buses, a first and a second normally closed circuit breaker connected to said first and said second buses, respectively, intermediate the ends thereof, each of said circuit breakers being of the automatic reclosing type and having first means for establishing normal and second means for establishing alternate time delay tripping characteristics, said circuit interrupter being of the automatic reclosing type having a time delay tripping characteristic whose tripping time interval is less than the tripping time intervals of said normal tripping time characteristics and greater than the time intervals of said alternate tripping time characteristics, third means responsive to predetermined circuit condition in either bus for closing said circuit interrupter, and fourth means responsive to predetermined circuit conditions in the associated but for shifting operation of a selected one of said circuit breakers closest to the said conditions to operation under its alternate tripping characteristic whereby a faulted section of bus is isolated and all other bus sections remain energized; each of said third and said fourth means comprising a device activated in response to a loss of voltage in the bus at its associated circuit interrupting means to activate said third and fourth means; each of said devices including fifth means for retarding operation thereof until a predetermined time interval has elapsed; each of said devices including a solenoid energizable by a voltage source to which its associated circuit interrupting means is connected.

4. A first and a second bus, normally open circuit interrupter which when closed serially connects said buses, a first and a second normally closed circuit breaker connected to said first and said second buses, respectively, intermediate the ends thereof, each of said circuit breakers being of the automatic reclosing type and having first means for establishing normal and second means for establishing alternate time delay tripping characteristics, said circuit interrupter being of the automatic reclosing type having a time delay tripping characteristic whose tripping time interval is less than the tripping time intervals of said normal tripping time characteristics and greater than the time intervals of said alternate tripping time characteristics, third means responsive to predetermined circuit conditions in either bus for closing said circuit interrupter, and fourth means responsive to predetermined circuit conditions in the associated bus for shifting operation of a selected one of said circuit breakers closest to the said conditions to operation under its alternate tripping characteristic whereby a faulted section of bus is isolated and all other bus sections remain energized; each of said third and said fourth means comprising a device activated in response to a loss of voltage in the bus at its associated circuit interrupting means to activate said third and fourth means; each of said devices including fifth means for retarding operation thereof until a predetermined time interval has elapsed; each of said devices including a solenoid energizable by a voltage source to which its associated circuit interrupting means is connected; biasing means; said solenoid having a plunger movable to a first position upon energization of said solenoid against the force of said biasing means urging said plunger to a second position; said plunger being operatively connected to said third means whereby movement of said plunger from said first to said second position is retarded.

5. A first and a second bus, normally open circuit interrupter which when closed serially connects said buses, a first and a second normally closed circuit breaker connected to said first and said second buses, respectively, intermediate the ends thereof, each of said circuit breakers being of the automatic reclosing type and having first means for establishing normal and second means for establishing alternate time delay tripping characteristics, said circuit interrupter being of the automatic reclosing type having a time delay tripping characteristic whose tripping time interval is less than the tripping time intervals of said normal tripping time characteristics and greater than the time intervals of said alternate tripping time characteristics, third means responsive to predetermined circuit conditions in either bus for closing said circuit interrupter, and fourth means responsive to predetermined circuit conditions in the associated bus for shifting operation of a selected one of said circuit breakers closest to the said conditions to operation under its alternate tripping characteristics whereby a faulted section of bus is isolated and all other bus sections remain energized; each of said third and said fourth means comprising a device activated in response to a loss of voltage in the bus at its associated circuit interrupting means to activate said third and fourth means; each of said devices including fifth means for retarding operation thereof until a predetermined time interval has elapsed; each of said devices including a solenoid energizable by a voltage source to which its associated circuit interrupting means is connected; biasing means; said solenoid having a plunger movable to a first position upon energization of said solenoid against the force of said biasing means urging said plunger to a second position; said plunger being operatively connected to said third means whereby movement of said plunger from said first to said second position is retarded; said device also including an operating member biased to a third posiiton, latch means for retaining said arm in a fourth position, said latch means being releasable by said plunger upon movement thereof to said second position.

6. A first and a second bus, normally open circuit interrupter which when closed serially connects said buses, a first and a second normally closed circuit breaker connected to said first and said second buses, respectively, intermediate the ends thereof, each of said circuit breakers being of the automatic reclosing type and having first means for establishing normal and second means for establishing alternate time delay tripping characteristics, said circut interrupter being of the automatic reclosing type having a time delay tripping characteristic whose tripping time interval is less than the tripping time intervals of said normal tripping time characteristics and greater than the time intervals of said alternate tripping time characteristics, third means responsive to predetermined circuit condition in either bus for closing said circuit interrupter, and fourth means responsive to predetermined circuit conditions in the associated bus for shifting operation of a selected one of said circuit breakers closest to the said conditions to operation under its alternate tripping characteristics whereby a faulted section of bus is isolated and all other bus sections remain energized; each of said third and said fourth means comprising a device activated in response to a loss of voltage in the bus at its associated circuit interrupting means to activate said third and fourth means; each of said devices including fifth means for retarding operation thereof until a predetermined time interval has elapsed; each of said devices including a solenoid energizable by a voltage source to which its associated circuit interrupting means is connected; biasing means; said solenoid having a plunger movable to a first position upon energization of said solenoid against the force of said biasing means urging said plunger to a second position; said plunger being operatively connected to said third means whereby movement of said plunger from said first to said second position is retarded; said device also including an operating member biased to a third position, latch means for retaining said arm in a fourth position, said latch means being releasable by said plunger upon movement thereof to said second position; a switch connected in circuit between said solenoid and its energizing means; operation of said operating member to said third position being effective to open said switch.

7. A sequence changing device for an automatic recloser having first and second time delay settings for protecting a transmission circuit, said device including a member operatively connected to a recloser timer-integrator means for changing the recloser tripping sequence, a first means responsive to predetermined circuit conditions of the circuit being protected for effecting operation of said member in a first direction; time delay means connected to said first means for retarding operation of said member unless said predetermined circuit conditions exist for a predetermined interval of time.

8. A sequence changing device for an automatic recloser having first and second time delay settings for protecting a transmission circuit, said device including a member operatively connected to a recloser timer-integrator means for changing the recloser tripping sequence, biasing means; latch means for restraining movement of said member in a direction indicated by said biasing means, first means responsive to predetermined circuit conditions of the circuit being protected for unlatching said latch means, time delay means associated with said first means for retarding unlatching of said latch means unless said predetermined circuit conditions exist for a predetermined interval of time.

9. A sequence changing device for an automatic recloser having first and second time delay settings for protecting a transmission circuit, said device including a member adapted to be operatively connected to a recloser timer-integrator means for changing the recloser tripping sequence, biasing means; latch means for restraining movement of said member in a direction indicated by said biasing means, first means responsive to predetermined circuit conditions of the circuit being protected for unlatching said latch means, time delay means associated with said first means for retarding unlatching of said latch means unless said predetermined circuit conditions exist for a predetermined interval of time; said first means comprising a solenoid energized by a voltage source to which its associated recloser is connected.

10. A sequence changing device for an automatic recloser having first and second time delay settings for protecting a transmission circuit, said device including a member adapted to be operatively connected to a recloser timer-integrator means for changing the recloser tripping sequence, biasing means; latch means for restraining movement of said member in a direction indicated by said biasing means, first means responsive to predetermined circuit conditions of the circuit being protected for unlatching said latch means, time delay means associated with said first means for retarding unlatching of said latch means unless said predetermined circuit conditions exist for a predetermined interval of time; said latch means comprising an element biased in a first direction, said first means having an extension engaged by said element when said latch means is latched, said first means being effective to move said element out of engagement with said extension.

11. A sequence changing device for an automatic recloser having first and second time delay settings for protecting a transmission circuit, said device including a member adapted to be operatively connected to a recloser timer-integrator means for changing the recloser tripping sequence, biasing means; latch means for restraining movement of said member in a direction indicated by said biasing means, first means responsive to predetermined circuit conditions of the circuit being protected for unlatching said latch means, time delay means associated with said first means for retarding unlatching of said latch means unless said predetermined circuit conditions exist for a predetermined interval of time; said first means comprising a solenoid energized by a voltage source to which its associated recloser is connected; said latch means comprising an element biased in a first direction, said first means having an extension engaged by said element when said latch means is latched, said first means being effective to move said element out of engagement with said extension, a plunger associated with said solenoid and biased toward operative engagement with said element for moving same out of engagement with said extension, said solenoid when energized being effective to move said plunger out of operative engagement with said element.

12. A sequence changing device for an automatic recloser having first and second time delay settings for protecting a transmission circuit, said device including a member adapted to be operatively connected to a recloser timer-integrator means for changing the recloser tripping sequence, biasing means; latch means for restraining movement of said member in a direction indicated by said biasing means, first means responsive to predetermined circuit conditions of the circuit being protected for unlatching said latch means, time delay means associated with said first means for retarding unlatching of said latch means unless said predetermined circuit conditions exist for a predetermined interval of time; said first means comprising a solenoid energized by a voltage source to which its associated recloser is connected; a switch connected in circuit between said solenoid and its energizing means, said member when moved by its biasing means being effective to cause opening of said switch.

13. A sequence changing device for an automatic recloser having first and second time delay settings for protecting a transmission circuit, said device including a member adapted to be operatively connected to a recloser timer-integrator means for changing the recloser tripping sequence, biasing means; latch means for restraining movement of said member in a direction indicated by said biasing means, first means responsive to predetermined circuit conditions of the circuit being protected for unlatching said latch means, time delay means associated with said first means for retarding unlatching of said latch means unless said predetermined circuit conditions exist for a predetermined interval of time; said first means comprising a solenoid energized by a voltage source to which its associated recloser is connected; said latch means comprising an element biased in a first direction, said first means having an extension engaged by said element when said latch means is latched, said first means being effective to move said element out of engagement with said extension, a plunger associated with said solenoid and biased toward operative engagement with said element for moving same out of engagement with said extension, said solenoid when energized being effective to move said plunger out of operative engagement with said element; a switch connected in circuit between said solenoid and its energizing means, said member when moved by its biasing means being effective to cause opening of said switch.

14. A contact engagement changing device for an automatic recloser having first and second time delay settings for protecting a transmission circuit, said device including a member operatively connected to a recloser timer-integrator means for changing the recloser contact engagement, a first means responsive to predetermined circuit conditions of the circuit being protected for effecting operation of said member in a first direction; time delay means connected to said first means for retarding operation of said member unless said predetermined circuit conditions exist for a predetermined interval of time.

15. A contact engagement changing device for an automatic recloser, said recloser contacts serially connecting a first and second bus when closed, said device including a member operatively connected to a recloser timer-integrator means for changing the recloser contact engagement; a first means responsive to predetermined circuit conditions in at least one of said buses for effecting operation of said member in a first direction; time delay means connected to said first means for retarding operation of said member unless said predetermined circuit conditions exist for a predetermined interval of time.

16. A contact engagement changing device for an automatic recloser, said recloser contacts serially connecting a first and second bus when closed, said device including a member operatively connected to a recloser timer-integrator means for changing the recloser contact engagement; a first means responsive to predetermined circuit conditions in at least one of said buses for effecting operation of said member in a first direction; time delay means connected to said first means for retarding operation of said member unless said predetermined circuit conditions exist for a predetermined interval of time; said first means including a device activated in response to a loss of voltage at said bus.

References Cited in the file of this patent
UNITED STATES PATENTS

| | | |
|---|---|---|
| 1,740,447 | Bauch | Dec. 24, 1929 |
| 1,795,198 | Connell | Mar. 3, 1931 |
| 2,172,950 | Anderson | Sept. 12, 1939 |
| 2,282,348 | Thumin | May 12, 1942 |
| 2,994,805 | Nash | Aug. 1, 1961 |